(12) United States Patent
Bostley, III et al.

(10) Patent No.: US 6,201,871 B1
(45) Date of Patent: Mar. 13, 2001

(54) SECURE PROCESSING FOR AUTHENTICATION OF A WIRELESS COMMUNICATIONS DEVICE

(75) Inventors: Phil J. Bostley, III; Raghavan Srinivasan; Andrew D. Eckhardt, all of Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/136,894

(22) Filed: Aug. 19, 1998

(51) Int. Cl.[7] ................................................. H04K 1/00
(52) U.S. Cl. ............................................. 380/249; 380/272
(58) Field of Search ........................................ 380/249, 272

(56) References Cited

U.S. PATENT DOCUMENTS

| | | | |
|---|---|---|---|
| 5,153,919 | * 10/1992 | Reeds | 380/44 |
| 5,371,794 | * 12/1994 | Diffie | 380/21 |
| 5,392,356 | * 2/1995 | Konno et al. | 380/23 |
| 5,537,474 | * 7/1996 | Brown | 380/23 |
| 5,642,401 | * 6/1997 | Yahagi | 379/58 |

FOREIGN PATENT DOCUMENTS 0 853 438 * 7/1998 (EP) ........................... H04Q/7/32

OTHER PUBLICATIONS

Sun Lim Kyeongsuk Shin, Introduction, ETRI Journal 19(3), pp. 187–201, Oct. 1997.*
Shin, Lee, Han, Mobile System Architecture, ETRI Journal 19(3), Oct. 1997.*
Han, Bahk and Yang, CDMA Mobile System Overview, ETRI Journal 19(3) pp. 83–97, Oct. 1997.*

* cited by examiner

Primary Examiner—Gail O. Hayes
Assistant Examiner—James Seal
(74) Attorney, Agent, or Firm—Philip R. Wadsworth; Thomas R. Rouse; Christopher O. Edwards

(57) ABSTRACT

The invention provides technology that improves the security of the A-Keys in a wireless communications system. The technology effectively prevents any human access to the A-Keys and eliminates cloning. The invention improves the security and integrity of the wireless communications system. A secure processor exchanges random numbers with a wireless communications device to generate the A-Key. The secure processor then encrypts the A-Key and transfers the encrypted A-Key to an authentication system. When the authentication system generates or updates the SSD, the authentication system transfers the encrypted A-Key and other information to the secure processor. The secure processor decrypts the A-Key and calculates the SSD. The secure processor transfers the SSD to the authentication system for use in authenticating the wireless communications device.

43 Claims, 11 Drawing Sheets

SECURE PROCESSING FOR AUTHENTICATION OF A WIRELESS COMMUNICATIONS DEVICE

BACKGROUND OF THE INVENTION

I. Field of the Invention

The present invention relates to the field of wireless communications. More particularly, the present invention relates to a novel and improved system that encrypts the information used to authenticate a wireless communications device.

II. Description of the Related Art

The security of a wireless communications system is an important factor in determining the quality of the system. A major security threat to wireless communications systems is the cloning of wireless communications devices. Each wireless communications device has an authentication key (A-Key). The wireless communications system uses the A-key along with other information to authenticate the wireless communications device, and the wireless communications device may be denied service without proper authentication.

This other information used with the A-key to authenticate the wireless communications device is typically broadcast over the air and is relatively easy to obtain. The A-key is the one piece of information that should remain absolutely secret within the wireless communications device and the wireless communications system. If the A-Key is obtained, then the legitimate wireless communications device can be readily cloned given the available access to the other information. The wireless communications system is unable to differentiate between the legitimate wireless communications device and the clone.

Unfortunately, the user of the legitimate wireless communications device is improperly billed for calls made with the clone. The wireless communications system typically forgives the fraudulent bills, but the reputation of the wireless communications system is damaged. The wireless communications system must also increase capacity to handle fraudulent calls without obtaining any associated revenue. The cost of the increased capacity is typically passed on to legitimate wireless communications device users.

The wireless communications system has an authentication system to authenticate wireless communications devices. The authentication system and the wireless communications device each use the A-key and a shared random number to generate identical Shared Secret Data (SSD). The authentication system and the wireless communications device periodically update the SSD. To authenticate a wireless communications device, the authentication system and the wireless communications device share another random number. The authentication system and the wireless communications device each use the SSD and this other random number to generate an authentication result. The wireless communications device is authenticated if it transfers a matching authentication result to the authentication system. Although technically possible, it is not computationally feasible to derive the A-Key from the authentication result considering the vast amount of computing power and time required.

The authentication system maintains large databases of A-Keys for millions of wireless communications devices. The mass storage of A-Keys poses a great risk. If a person obtains access to the authentication system, then that person can potentially clone large numbers of wireless communications devices and seriously undermine the security and integrity of the wireless communications system. The wireless communications system would be greatly improved by a technology that improves the security of A-Keys in a wireless communications system.

SUMMARY OF THE INVENTION

The present invention is a novel and improved system that provides security for the A-Keys in a wireless communications system. The system effectively prevents any human access to the A-Keys and eliminates cloning. The system improves the security and integrity of the wireless communications system.

The invention allows the authentication system to store only encrypted A-Keys. The decryption key for the encrypted A-Keys is stored in a secure processor. The authentication system uses the secure processor for A-key operations. The secure processor can be physically isolated to prevent human access to the A-Keys and the A-key decryption key. For example, the secure processor can be encased in concrete or placed in a vault. Thus, the decrypted authentication keys only exist momentarily in the secure processor, and the authentication system only stores encrypted A-keys. The invention eliminates the storage of large numbers of decrypted A-Keys.

The secure processor exchanges random numbers with the wireless communications device to generate the A-Key. The secure processor then encrypts the A-Key and transfers the encrypted A-Key to the authentication system. When the authentication system generates or updates the SSD, the authentication system transfers the encrypted A-Key and other information to the secure processor. The secure processor decrypts the A-Key and calculates the SSD. The secure processor transfers the SSD to the authentication system for use in authenticating the wireless communications device.

The A-Key is generated in the secure processor and it is not transferred from the secure processor unless it is encrypted. The decrypted A-Key is only present in the secure processor momentarily during its actual use and is not permanently stored. Thus, the invention eliminates the need for a database of non-encrypted A-Keys. The invention also restricts human access to the A-key decryption key.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Authentication in a wireless communications system is discussed in the IS-95 standard approved by the Telecommunications Industry Association and in the 41(d) standard of the American National Standards Institute (ANSI). Authentication relies on a secret Authentication Key (A-Key) that is stored in both the wireless device and the communications system. The wireless device and the communications system use the A-Key and other data to generate Shared Secret Data (SSD). The wireless device and the communications system use the SSD and other data to generate an authentication result. The authentication result generated by wireless device should be the same as the authentication result generated by the communications system. The two authentication results are compared, and the wireless device is authenticated if they match.

The A-Key is not transmitted and typically remains the same. The SSD is periodically updated because it may be transmitted over the signaling network, such as Signaling System #7. The SSD is not typically transmitted over the air between the wireless communications device and the wireless communications system. The SSD is used with other information to generate the authentication result that is transmitted over the air between the wireless communications device and the wireless communications system. The terms and operations described in the above two paragraphs are known in the art.

Figure 1:
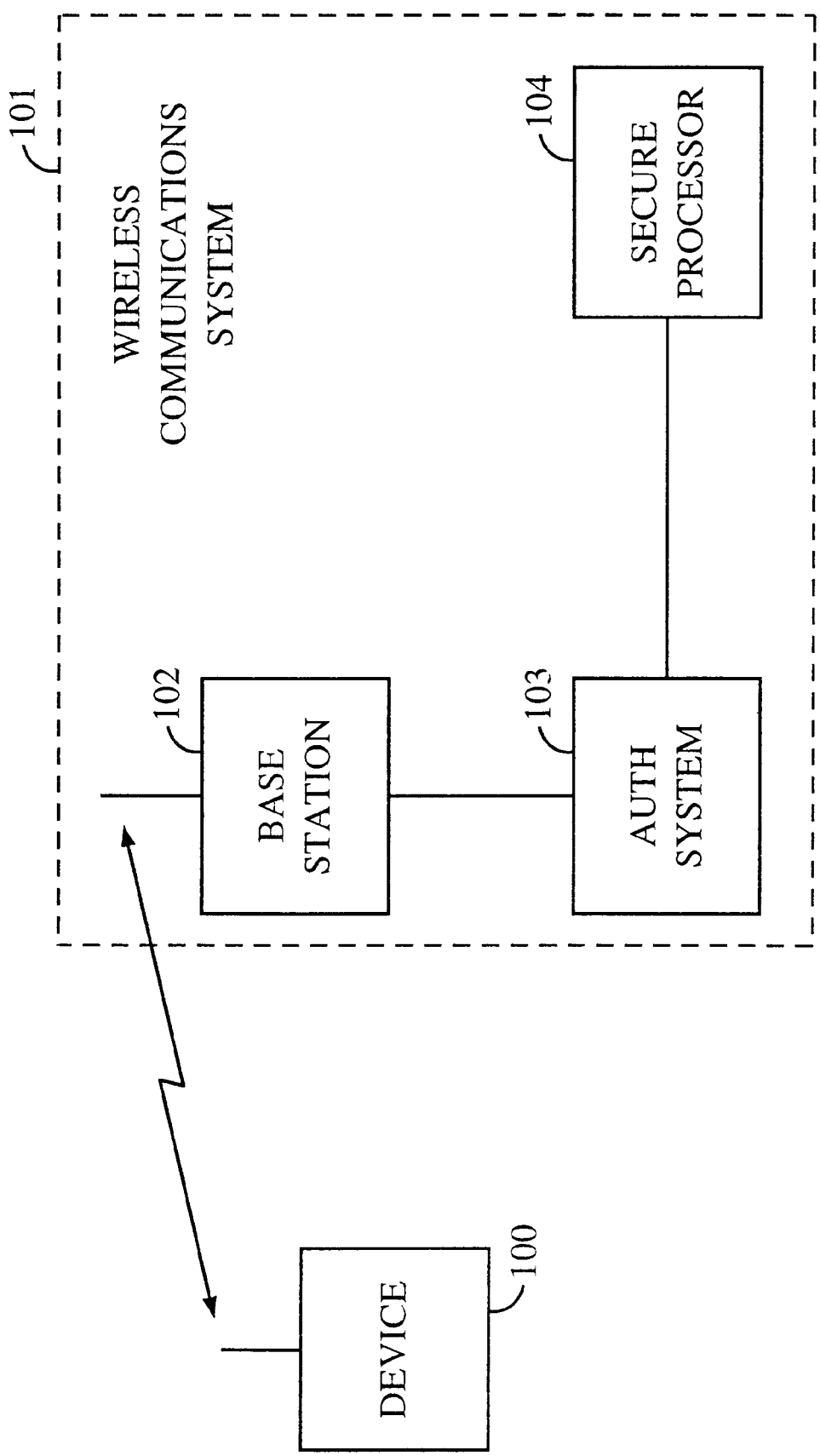
FIG. 1 is a block diagram of a wireless communications system in an embodiment of the invention.
Figure 2:
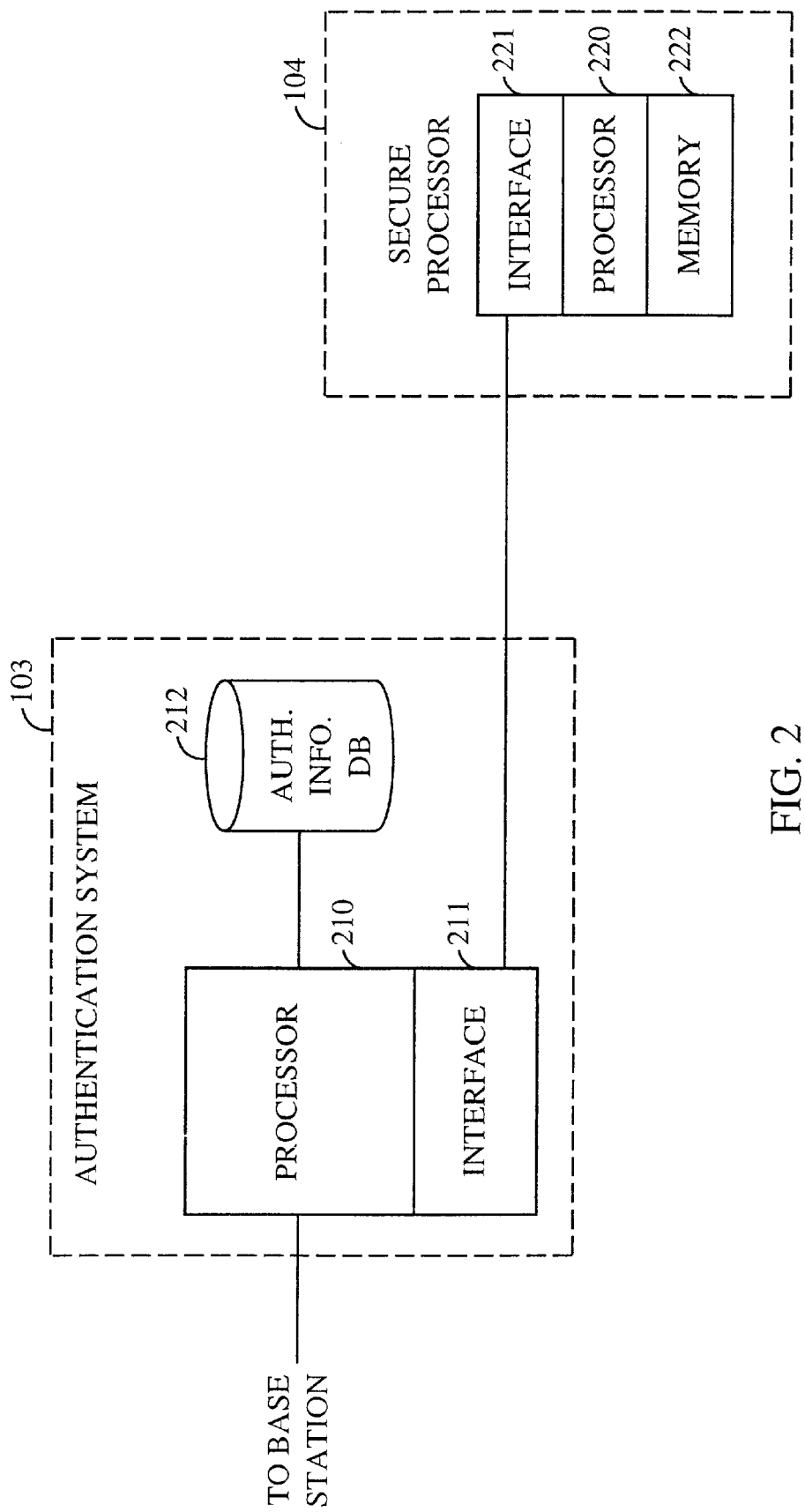
FIG. 2 is a block diagram of an authentication system and a secure processor in an embodiment of the invention.

System Configuration—FIGS. 1–2

FIG. 1 depicts a wireless communications device 100 that communicates with a wireless communications system 101. The wireless communications system 101 comprises a base station 102, an authentication system 103, and a secure processor 104. Typically, a wireless communications system includes multiple base stations and base station controllers that support numerous wireless communications devices. FIG. 1 has been simplified for clarity and omits some conventional elements known to those skilled in the art.

The wireless communications device 100 exchanges wireless communications signals with the base station 102 over the air interface. The wireless communications device 100 could be any wireless communications device that requires authentication, such as a mobile phone, wireless terminal, or computer. The wireless communications device 100 stores authentication information and authentication instructions for execution by an internal processor. The instructions direct the wireless communications device 100 to generate and store an A-Key, SSD, and authentication results. The instructions also direct the wireless communications device 100 to exchange information with the authentication system 103 to facilitate authentication.

The base station 102 exchanges wireless communications signals with the wireless communications device 100 over the air interface. The base station 102 also exchanges communications signals with other communications network elements, such as controllers, switches, and databases. The base station 102 is operationally coupled to the authentication system 103, typically through a base station controller. In some embodiments, the wireless communications device 100 and the base station 102 are Code Division Multiple Access (CDMA) devices. The IS-95 standard, approved by the Telecommunication Industry Association, provides a specification for CDMA in a wireless communication system.

The authentication system 103 provides an authentication service to the wireless communications device 100 and the base station 102. In some embodiments, the authentication system 103 forms a sub-system of a Home Location Register (HLR). The authentication system 103 is a computer system that stores authentication information and operating instructions for execution by an internal processor. The operating instructions direct the authentication system 103 to store encrypted A-Keys and SSD from the secure processor 104 and to generate authentication results. The operating instructions also direct the authentication system 103 to exchange information with the wireless communications device 100 and the secure processor 104 to authenticate the wireless communications device 100.

The secure processor 104 provides an encryption capability to the authentication system 103. Physical and electronic access to the secure processor 104 is typically heavily restricted. For example, the secure processor 104 may be placed in a vault or encased in concrete. The secure processor 104 stores and executes operating instructions. The operating instructions direct the secure processor 104 to generate and encrypt A-Keys for storage in the authentication system 103. The operating instructions also direct the secure processor 104 to generate SSD for storage and use in the authentication system 103.

FIG. 2 depicts the authentication system 103 and the secure processor 104 in greater detail. The authentication system 103 comprises a processor 210, an interface 211, and an authentication information database 212. The secure processor 104 comprises a processor 220, an interface 221, and a memory 222. The interfaces 211 and 221 are connected by a data link and comprise any system that supports data transfer between the authentication system 103 and the secure processor 104. The interfaces 211 and 221 could support conventional communications, such as serial communications or Ethernet. The authentication information database 212 stores the SSD and encrypted A-Keys. The authentication information database 212 may also store operating instructions for the processor 210. The memory 222 is a storage medium that stores operating instructions and decryption keys for the processor 220.

The processors 210 and 220 could be conventional microprocessors, or groups of microprocessors, that execute operating instructions. The processor 210 executes instructions that cause the authentication system to interact with the wireless communications device 100 and the secure processor 104 to authenticate the wireless communications device 100. The processor 220 executes instructions that cause the secure processor 104 to interact with the authentication system 103 to generate an encrypted A-Key and to subsequently decrypt the encrypted A-Key and generate the SSD.

The operating instructions stored in the secure processor 104, the authentication system 103, and the wireless communications device 100 could be software stored on conventional storage medium. The storage medium could be a conventional memory, disk, or integrated circuit. The processors in the secure processor 104, the authentication system 103, and the wireless communications device 100 execute the software. When executed, the software directs the processors to operate in accord with the invention. This operation will become readily apparent to those skilled in the art in the following discussion of FIGS. 3–8.

System Operation—FIGS. 3–8

Those skilled in the art will recognize that processing and messages depicted on FIGS. 3–8 have been simplified, and that some conventional aspects of authentication have been omitted for clarity. In addition, the base station and the base station controller that are typically located between the wireless device and the authentication system have been omitted for clarity. Those skilled in the art will appreciate the operation of these devices within the context of FIGS. 3–8.

Figure 3:
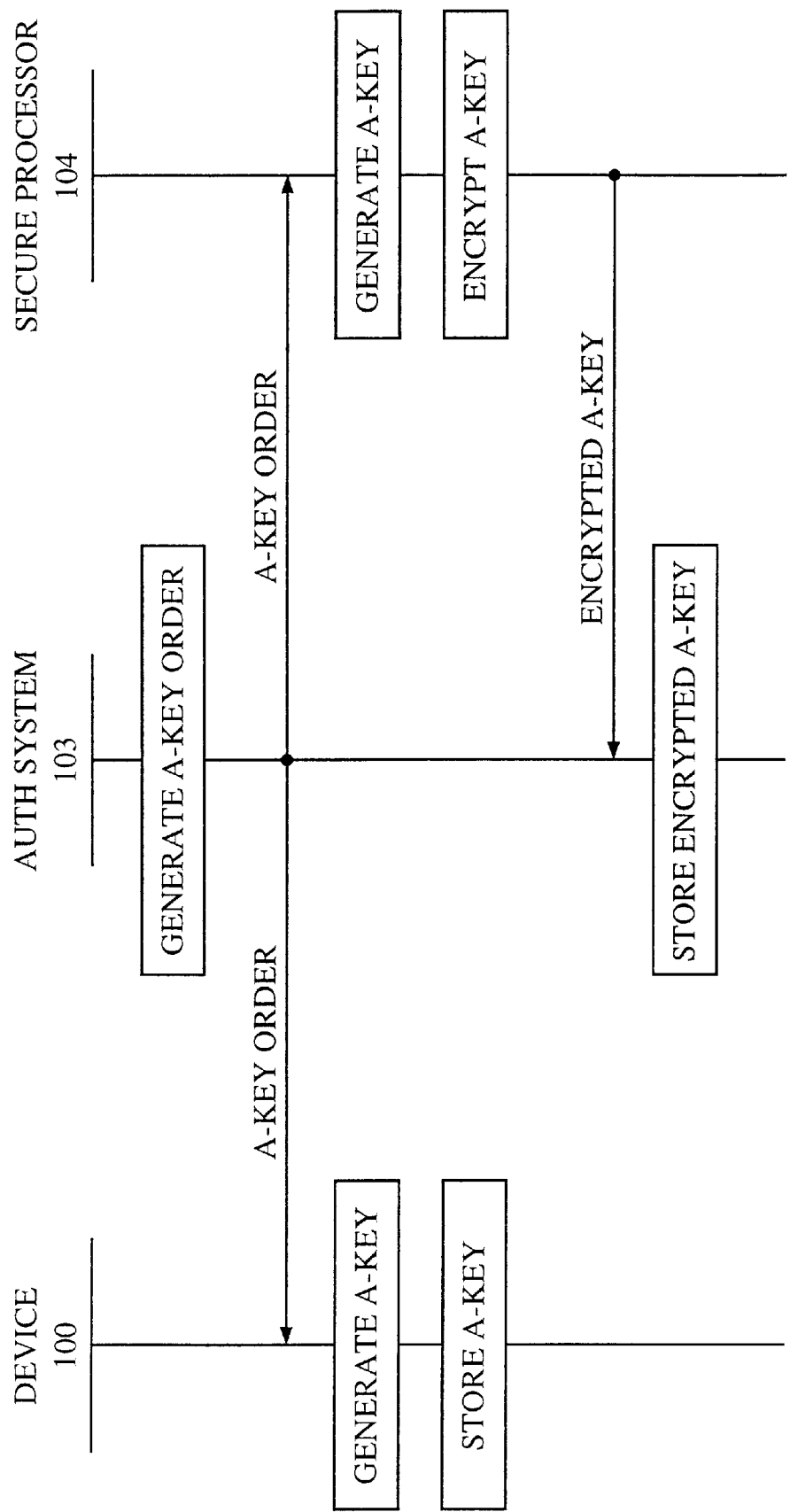
FIG. 3 is process diagram illustrating A-Key generation in an embodiment of the invention.

FIG. 3 depicts A-Key generation. The A-key is typically generated when service to the wireless communications device 100 is initially provisioned, such as during an Over-The-Air Service Provisioning (OTASP) operation. The A-Key generation process begins when the authentication system 103 generates an A-Key order and transmits the A-Key order to the device 100 and the secure processor 104. The A-Key order contains parameters for A-Key generation. The device 100 and the secure processor 104 generate an A-Key. Typically, A-Key generation between remote devices requires an exchange of random numbers to jointly calculate the A-Key. The device 100 stores the A-Key. The secure processor 104 encrypts the A-Key and transfers the encrypted A-Key to the authentication system 103. The authentication system 103 stores the encrypted A-Key.

Figure 4:
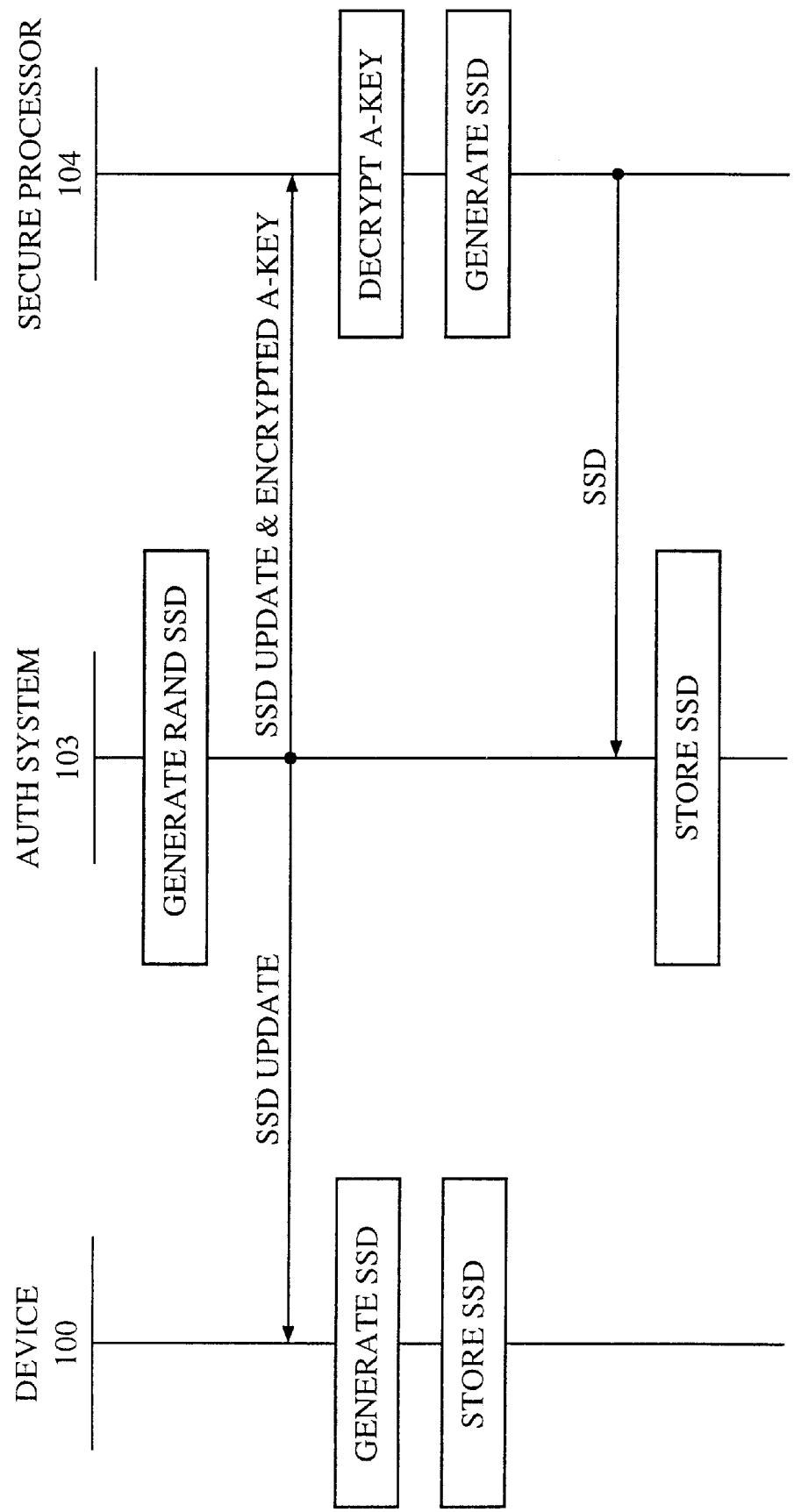
FIG. 4 is process diagram illustrating SSD generation or update in an embodiment of the invention.

FIG. 4 depicts SSD generation or SSD update. The authentication system 103 generates a random number RANDSSD. The authentication system 103 sends an SSD update to the device 100 and the secure processor 104. The SSD update contains parameters for SSD generation, such as the RANDSSD. The SSD update to the secure processor 104 includes the encrypted A-Key. The secure processor 104 decrypts the A-Key. The secure processor 104 uses the A-Key to generate the SSD and sends the SSD to the authentication system 103. The authentication system 103 stores the SSD. The device 100 uses the A-Key to generate and store the SSD. After the A-Keys are stored, the device 100 and the authentication system 103 may execute a base station challenge to confirm the validity of the SSD generation.

Figure 5:
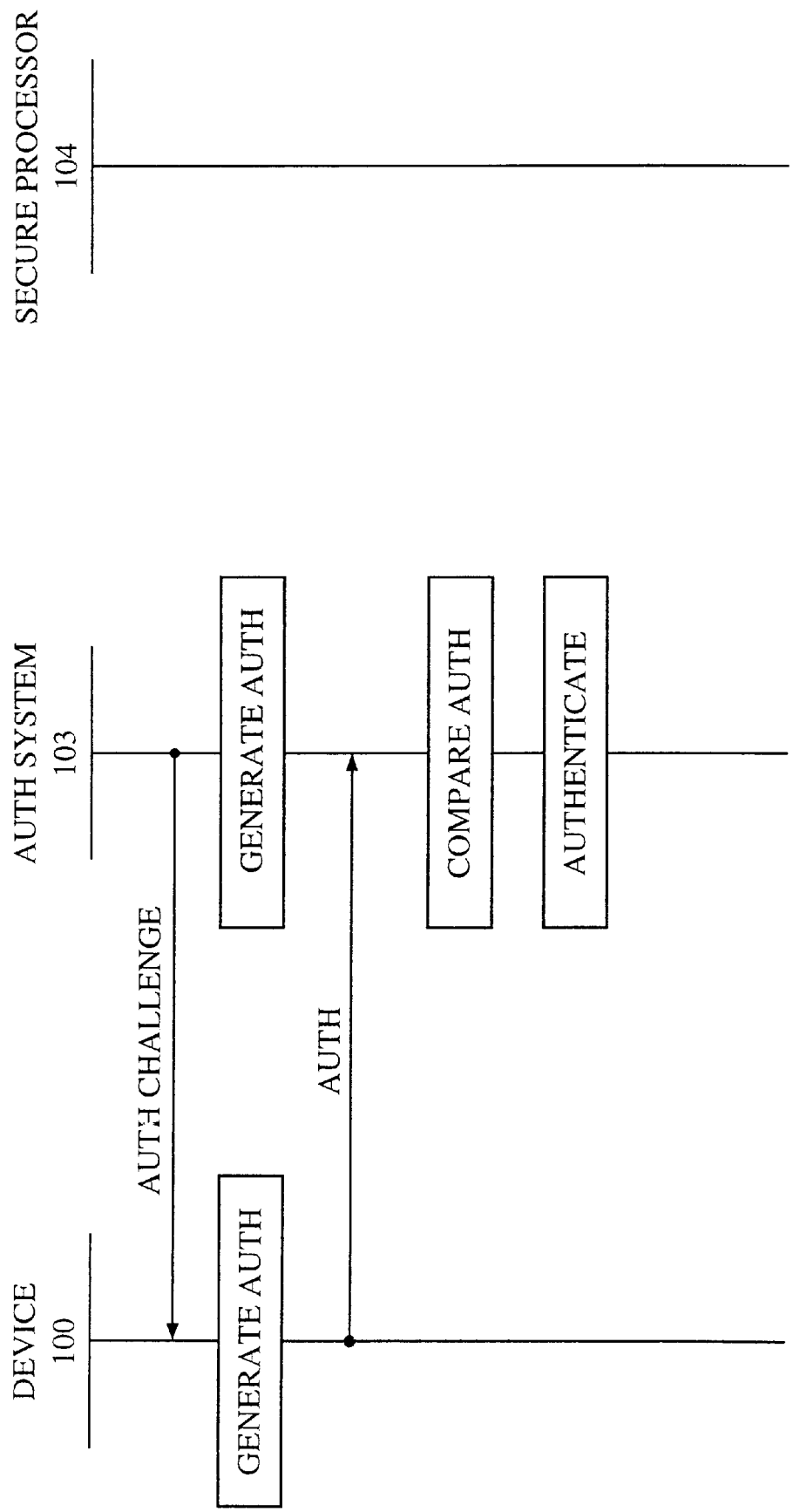
FIG. 5 is process diagram illustrating wireless communications device authentication in an embodiment of the invention.

FIG. 5 depicts one example of authentication in the form of a unique challenge, but the invention is not restricted to this particular form of authentication. The authentication system 103 sends an authentication challenge to the device 100. In another form of authentication, the mobile switching center may broadcast the authentication challenge to the device 100 and provide the authentication challenge to the authentication system 103. In either case, the authentication challenge contains parameters for generation of an authentication result (AUTH). The device 100 and the authentication system 103 each use their internally stored SSD and a random number from the challenge message to generate AUTH. The device 100 transfers the AUTH to the authentication system 103 where the two AUTHs are compared. The authentication system 103 authenticates the device 100 if the AUTHs match.

Figure 6:
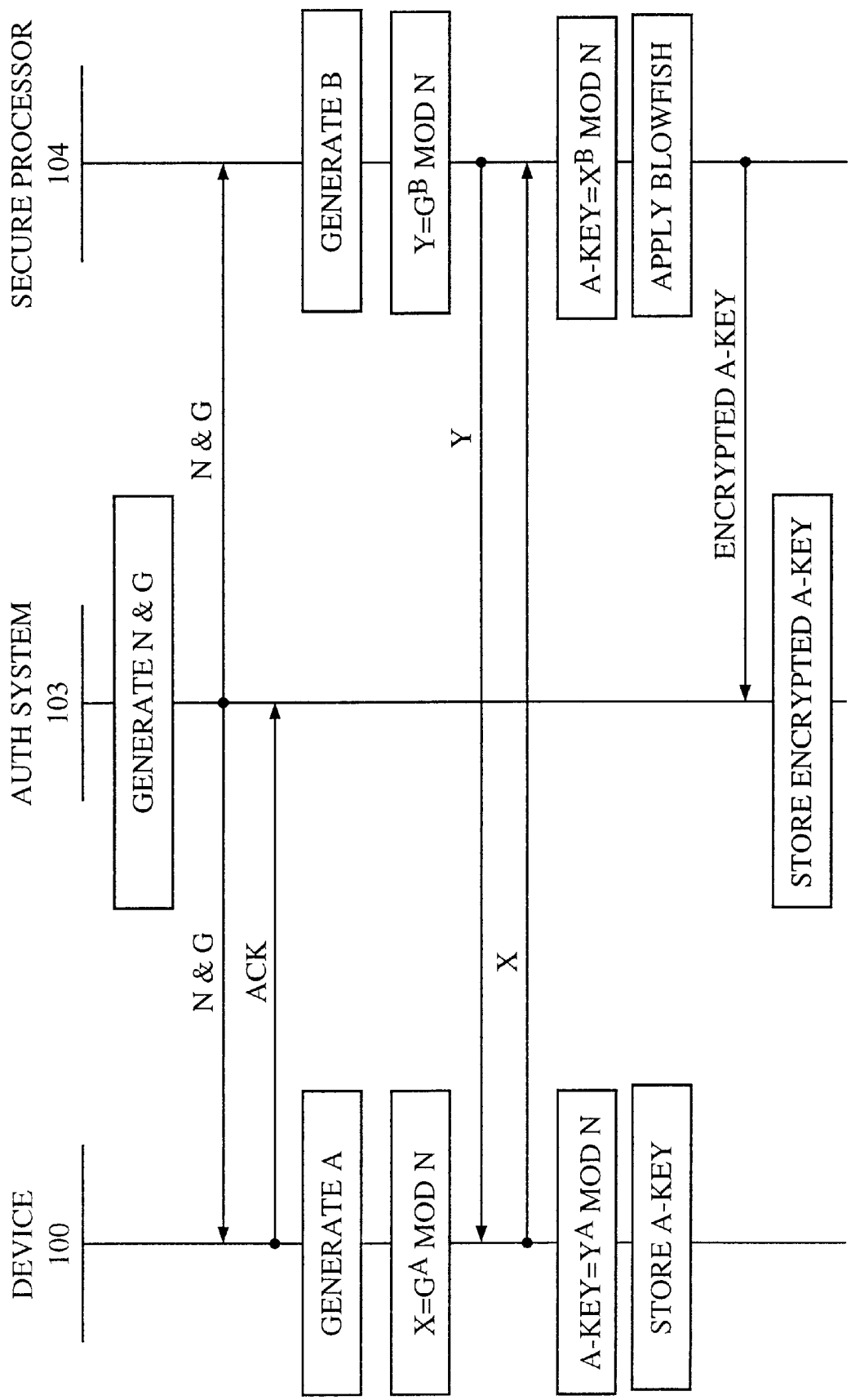
FIG. 6 is process diagram illustrating A-Key generation using Diffie-Hellman in an embodiment of the invention.
Figure 7:
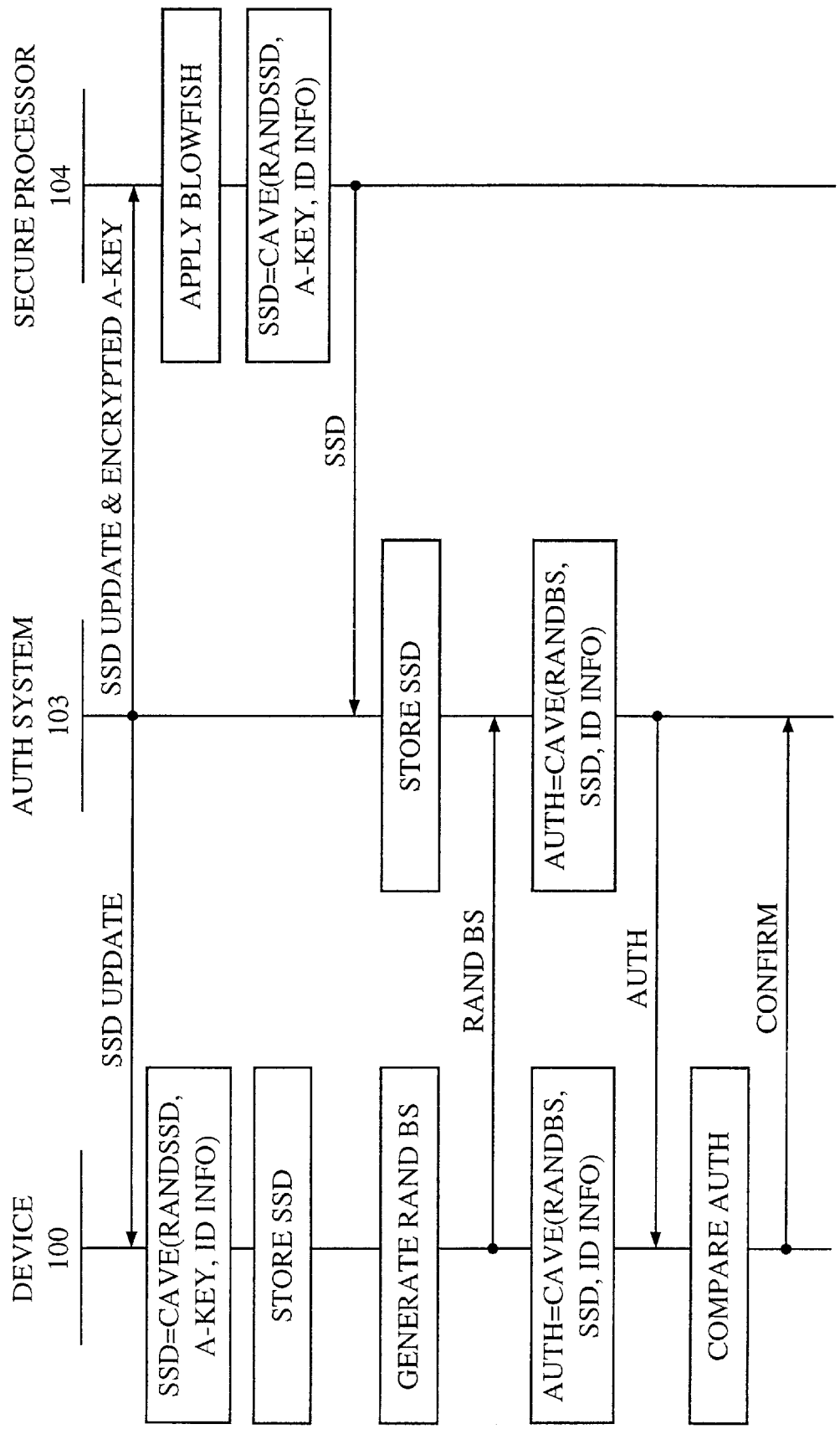
FIG. 7 is process diagram illustrating SSD generation or update using CAVE in an embodiment of the invention.
Figure 8:
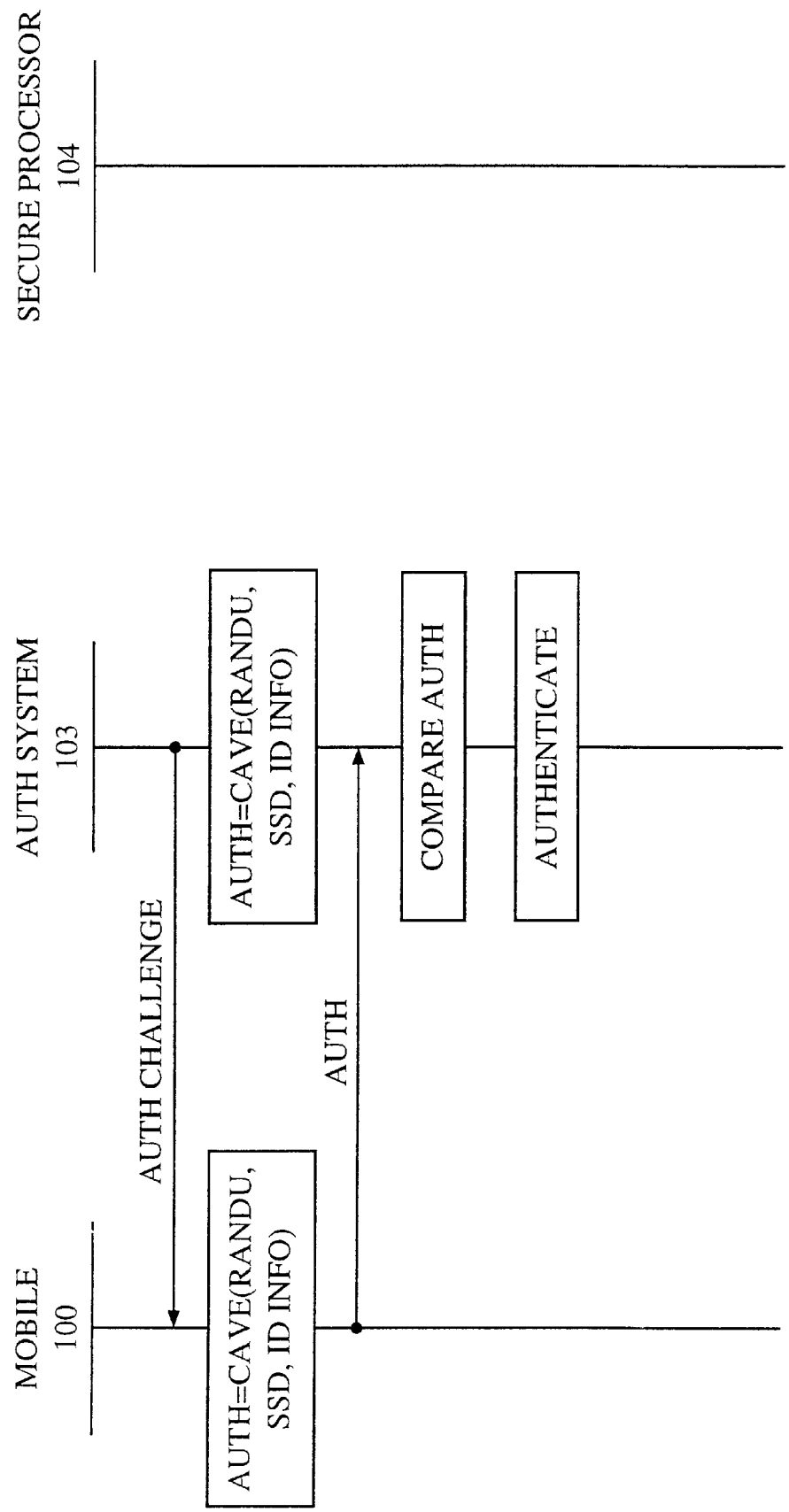
FIG. 8 is process diagram illustrating wireless communications device authentication using CAVE in an embodiment of the invention.

FIGS. 6–8 depict a specific embodiment of the operation depicted in FIGS. 3–5, but the invention is not restricted to this specific embodiment. FIG. 6 depicts A-Key generation using the Diffie-Hellman algorithm and Blowfish encryption. Diffie-Hellman is a known algorithm for two remote systems to agree on a secret key. Blowfish is a known encryption technique. Diffie-Hellman discussed in U.S. Pat. No. 4,200,770 entitled "Cryptographic Apparatus and Method." Diffie-Hellman and Blowfish are also discussed in the book Applied Cryptography by Bruce Schneier, 2nd edition, published by John Wiley & Sons of New York, ISBN 0-471-11709-9.

The secure processor 104 generates and stores a Blowfish encryption key, typically upon installation. The authentication system 103 generates two integers N and G and transfers N and G to the device 100 and the secure processor 104. The device 100 generates a large random integer A, and the secure processor 104 generates a large random integer B. The device 100 calculates $X=G^A \mod N$, and the secure processor 104 calculates $Y=G^B \mod N$. The "mod" operation is a known modulo calculation, such as that used with conventional time keeping at modulo 12 where 10:00+13 hours=23 mod 12=11:00. The device 100 and the secure processor 104 exchange X and Y. The device 100 then calculates $A\text{-Key}=Y^A \mod N$, and the secure processor 104 calculates $A\text{-Key}=X^B \mod N$. The two A-Keys should be the same. The device 100 stores the A-Key, typically using flash Read Only Memory (ROM). The secure processor 104 applies Blowfish to encrypt the A-Key and transfers the encrypted A-Key to the authentication system 103. The authentication system 103 stores the encrypted A-Key.

It should be noted that the A-Key is generated in the secure processor 104, but is not stored in the secure processor 104. In addition, the authentication system 103 only stores the encrypted A-Key. Therefore, the communications system does not have a large list of non-encrypted A-Keys. The decryption key for the encrypted A-Key is generated and stored only within the secure processor.

FIG. 7 depicts SSD generation or update using the Cellular Authentication Voice Encryption (CAVE) algorithm. The CAVE algorithm is a known one-way hash function. Two remote systems can each input the same secret ID into the CAVE algorithm and publicly share their respective output. The outputs are the same if the secret IDs are the same, yet the secret ID is impossible to derive from the output from a practical standpoint. The CAVE algorithm is discussed in Appendix A of the IS-54 standard approved by the Telecommunications Industry Association.

The authentication system 103 sends an SSD update to the device 100 and the secure processor 104. The SSD update to the device 100 contains the random number RANDSSD that was generated by the authentication system 103. The SSD update to the secure processor 104 includes the RANDSSD, encrypted A-Key, and other Identification Information (ID INFO). The ID INFO typically includes data such as an Electronic Serial Number (ESN) and a Mobile Identification Number (MIN) or an International Mobile Station Identity (IMSI). Those skilled in the art are familiar with the types of ID INFO and their respective use. Although the term "mobile" is used in the MIN and the IMSI, these values and the invention can be used in the context of fixed wireless systems.

The secure processor 104 applies Blowfish to decrypt the A-Key using its internally stored Blowfish key. The secure processor 104 inputs RANDSSD, A-Key and ID INFO into CAVE to generate the SSD. The secure processor 104 sends the SSD to the authentication system 103 where it is stored. The device 100 also inputs RANDSSD, A-Key, and ID INFO into CAVE to generate and store the SSD.

The device 100 and the authentication system 103 then execute a base station challenge to confirm proper SSD generation. The device 100 generates a random number (RANDBS) and transfers RANDBS to the authentication system 103. Both the device 100 and the authentication system 103 input RANDBS, SSD, and ID INFO into CAVE to generate an SSD authentication result (AUTH). The authentication system 103 transfers AUTH to the device 100 where the two AUTHs are compared. The device 100 confirms the successful SSD generation with the authentication system 103 if the two AUTHs match.

FIG. 8 depicts one example of authentication using CAVE. The authentication system 103 sends an authentication challenge to the device 100. The authentication challenge includes a random number (RANDU) for use in authentication. The device 100 and the authentication system 103 each input RANDU, SSD, and ID INFO into CAVE to generate an authentication result (AUTH). The device 100 transfers AUTH to the authentication system 103 where the two AUTHs are compared. The authentication system 103 authenticates the device 100 if the two AUTHs match.

Figure 9:
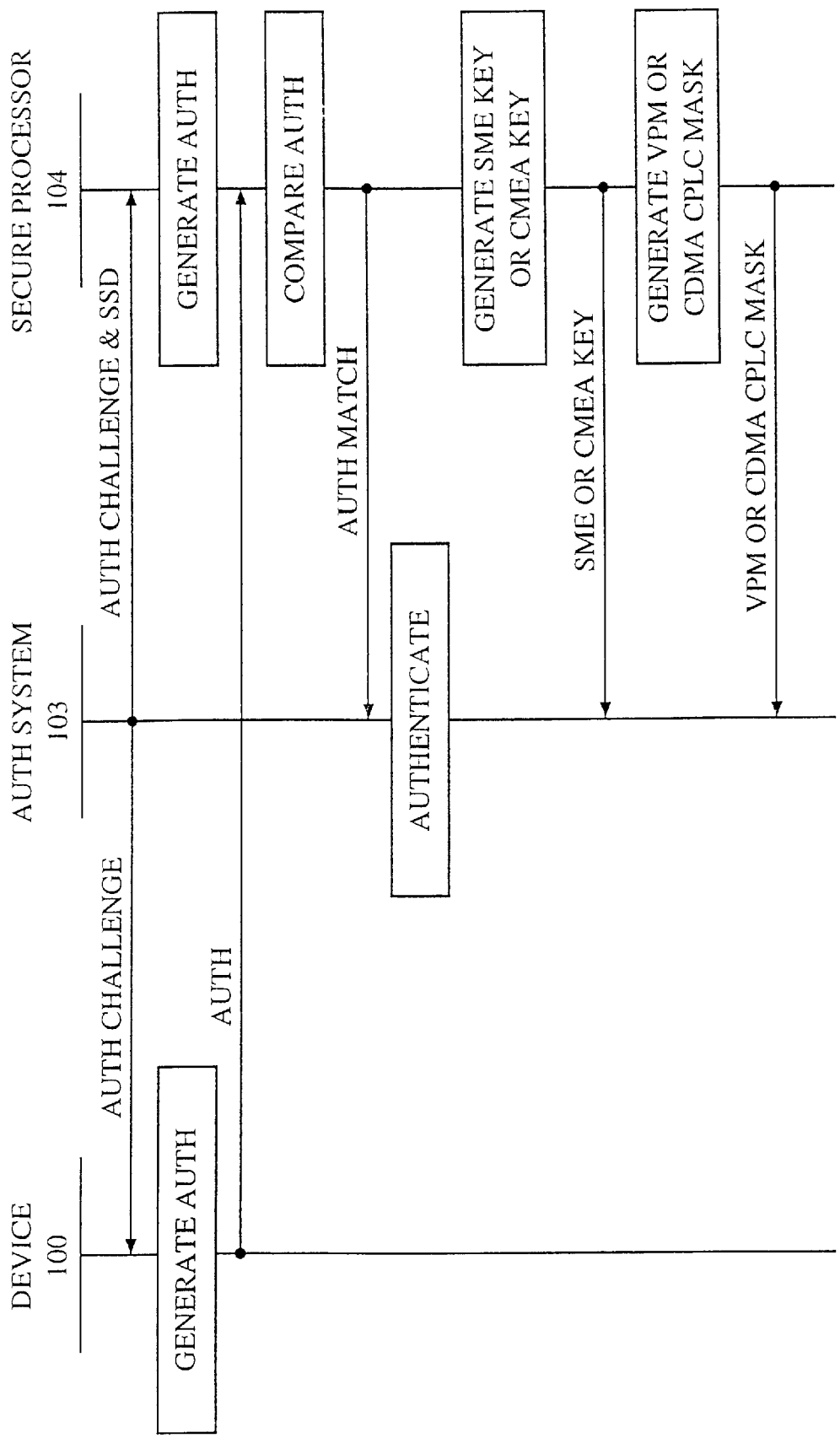
FIG. 9 is process diagram illustrating wireless communications device authentication in an alternative embodiment of the invention.

Alternative System Operation—FIG. 9

FIG. 9 depicts an alternative system operation where the secure processor generates the authentication result and other data. The authentication system 103 transfers an authentication challenge with a random number to the device 100 and the secure processor 104. The authentication challenge to the secure processor 104 also includes the SSD. The secure processor 104 generates an authentication result (AUTH) from the SSD and the random number. This could be accomplished using the CAVE algorithm as described above. The device 100 also generates AUTH from the SSD and the random number. The device 100 transfers its AUTH to the secure processor 104. The secure processor 104 compares the AUTHs and instructs the authentication system 103 if the two AUTHs match. The authentication system 103 authenticates the device 100 based on the match indicated by the secure processor 104. Alternatively, the device 100 and the secure processor 104 each transfer their respective AUTH to the authentication system 103 for comparison.

The secure processor 104 also generates either the Signaling Message Encryption (SME) key or the Cellular Message Encryption Algorithm (CMEA) key. Either key is used by the wireless communications system to encrypt signaling messages. The keys are typically generated by inputting results from the AUTH generation, the SSD, and the random number into CAVE. The secure processor 104 transmits the key to the authentication system 103. After the secure processor 104 generates the SME key or the CMEA key, it generates either a Voice Privacy Mask (VPM) or a CDMA Private Long Code Mask (PLCM). The masks are used to encode wireless voice conversations. The masks are typically generated by executing additional iterations of the CAVE algorithm used to generate the above keys. The secure processor 104 transfers the mask to the authentication system 103.

In FIG. 9, the secure processor 104 can generate AUTH, SME key, CMEA key, VPM, or CDMA PLCM values. This allows the CAVE algorithm to be located in the secure processor 104 and not in the authentication system 103. The removal of the CAVE algorithm from the authentication system 103 simplifies system design, distribution, and exportation. The secure processor 104 can also be adapted to perform other tasks involving CAVE.

Figure 10:
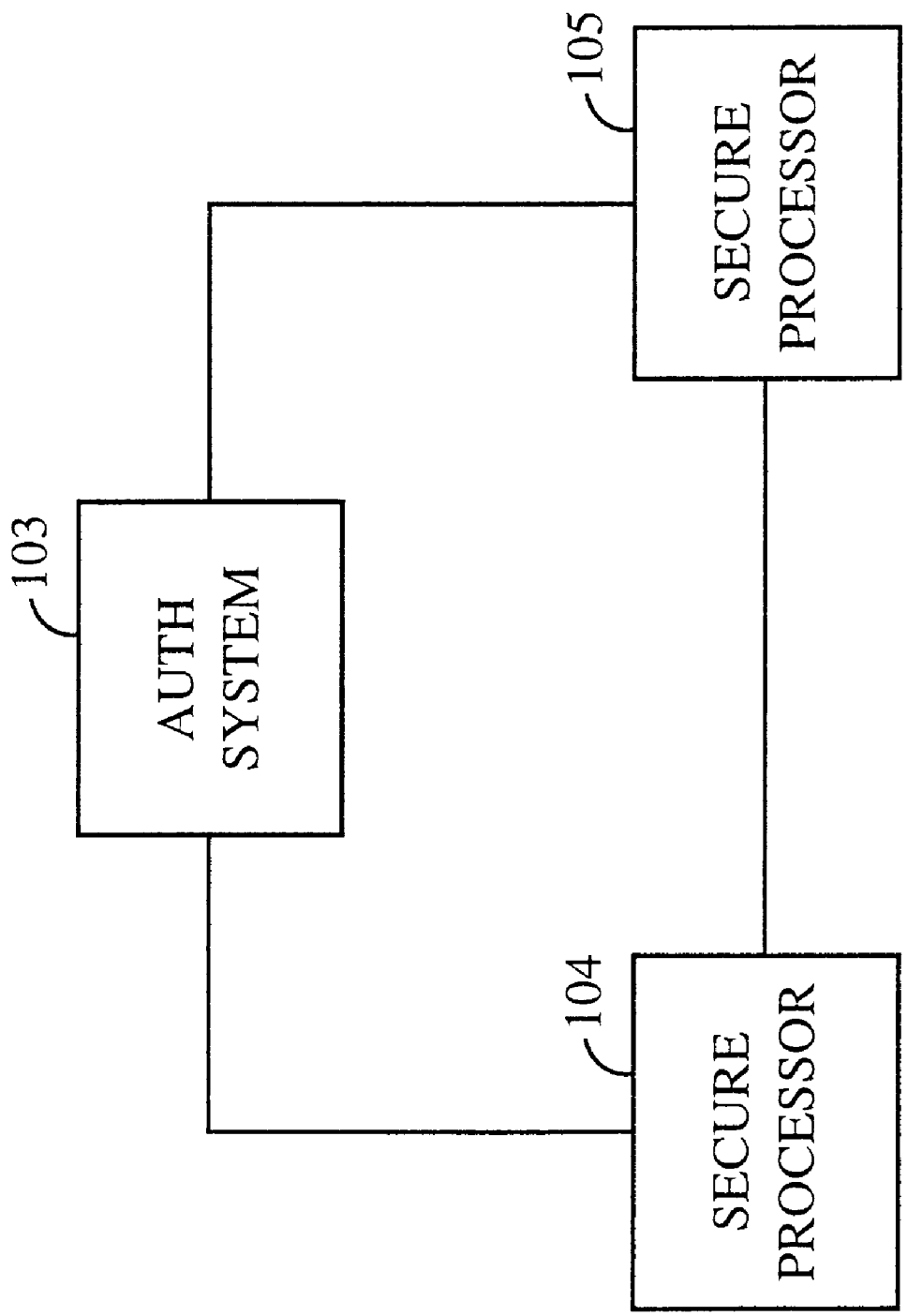
FIG. 10 is a block diagram of an authentication system and redundant secure processors in an embodiment of the invention.

Redundant Secure Processors—FIG. 10

FIG. 10 depicts authentication system 103 and secure processor 104. An additional secure processor 105 has been added and is connected to the authentication system 103 and the secure processor 104. The addition of the secure processor 105 provides better reliability and faster performance to the authentication system 103. If the secure processor 104 has not responded to an earlier authentication task, and the authentication system 103 must authenticate another user, then the authentication system 103 can send the new authentication task to the secure processor 105.

The secure processors 104 and 105 must each store the same encryption key, such as the same Blowfish key. The secure processors 104 and 105 could use either Diffie-Hellman or conventional public/private encryption techniques to agree on the same encryption key. If secure processor 104 fails and is replaced, the authentication system 103 can command the secure processor 105 to send its encryption key to the new secure processor using conventional encryption techniques.

Figure 11:
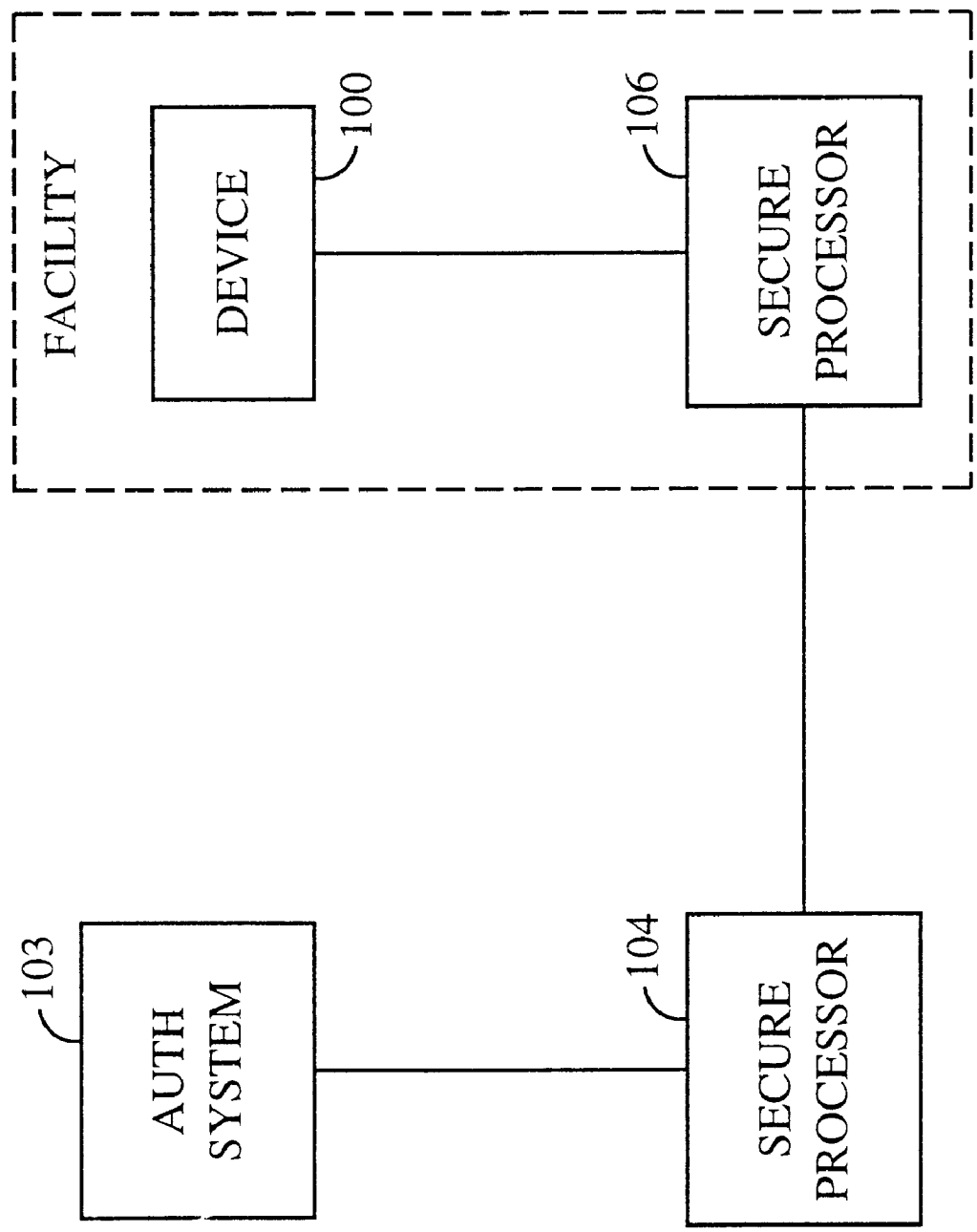
FIG. 11 is a block diagram of an authentication system and a secure processor coupled to another secure processor at a wireless communications device manufacturing facility in an embodiment of the invention.

A-Key Generation at the Manufacturing Facility—
FIG. 11

FIG. 11 depicts the authentication system 103 and the secure processor 104. An additional secure processor 106 is placed at the facility where the device 100 is manufactured. The secure processor 104 and the secure processor 106 agree on an encryption key in a secure manner. This agreement could be accomplished using conventional techniques.

During manufacture of the device 100, the secure processor 106 exchanges information with the wireless communications device 100 to generate an A-Key. The secure processor 106 encrypts the A-Key using the encryption key. The secure processor 106 transfers the encrypted A-Key onto a storage medium, such as a disk. The encrypted A-Keys are then loaded from the disk into the authentication system 103. Alternatively, secure processor 106 may transfer the encrypted A-Keys to authentication system 103 over a data link. The authentication system 103 receives the encrypted A-key and transfers the encrypted A-key to the secure processor 104.

The secure processor 104 receives the encryption key from the secure processor 106 and receives the encrypted A-Key from the authentication system 103. The secure processor 104 decrypts the encrypted A-Key using the encryption key and generates the SSD using the decrypted A-Key. The secure processor 104 transfers SSD to the authentication system 103. The authentication system 103 receives and stores the SSD from the secure processor 104.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for operating a wireless communications system, the method comprising:
   receiving an encrypted authentication key from an authentication system into a secure processor;
   decrypting the encrypted authentication key in the secure processor; and
   generating shared secret data in the secure processor using the decrypted authentication key.

2. The method of claim 1 further comprising transferring the shared secret data from the secure processor to the authentication system.

3. The method of claim 2 further comprising:
generating an authentication result in the authentication system using the shared secret data;
receiving another authentication result into the authentication system from the wireless communications device; and
in the authentication system, authenticating the wireless communications device if the authentication result generated in the authentication system matches the other authentication result from the wireless communications device.

4. The method of claim 3 further comprising:
generating the shared secret data in the wireless communications device using the authentication key;
generating the other authentication result in the wireless communications device using the shared secret data; and
transferring the other authentication result from the wireless communications device to the authentication system.

5. The method of claim 1 further comprising:
generating the authentication key in the secure processor;
encrypting the authentication key in the secure processor; and
transferring the encrypted authentication key from the secure processor to the authentication system.

6. The method of claim 5 further comprising:
receiving the encrypted authentication key from the secure processor into the authentication system; and
storing the encrypted authentication key in the authentication system.

7. The method of claim 1 further comprising generating an authentication result in the secure processor using the shared secret data.

8. The method of claim 7 further comprising:
receiving another authentication result into the secure processor from the wireless communications device; and
in the secure processor, comparing the authentication result generated in the authentication system to the other authentication result from the wireless communications device.

9. The method of claim 1 further comprising generating a Signaling Message Encryption key in the secure processor using the shared secret data.

10. The method of claim 1 further comprising generating a Cellular Message Encryption Algorithm key in the secure processor using the shared secret data.

11. The method of claim 1 further comprising generating a Voice Privacy Mask in the secure processor using the shared secret data.

12. The method of claim 1 further comprising generating a Code Division Multiple Access Private Long Code Mask in the secure processor using the shared secret data.

13. The method of claim 1 further comprising restricting physical access to the secure processor.

14. The method of claim 1 wherein the wireless communications device is a Code Division Multiple Access device.

15. The method of claim 1 wherein the authentication system comprises a home location register.

16. A method for generating an authentication key for use by a wireless communications system in authenticating a wireless communications device, wherein the wireless communications system includes an authentication system and a secure processor, the method comprising:
generating the authentication key in the secure processor;
encrypting the authentication key in the secure processor; and
transferring the encrypted authentication key from the secure processor to the authentication system.

17. The method of claim 16 further comprising:
receiving the encrypted authentication key from the secure processor into the authentication system; and
storing the encrypted authentication key in the authentication system.

18. The method of claim 16 wherein generating the authentication key further comprises:
generating a first number in the secure processor;
generating a second number in the secure processor using the first number;
transferring the second number from the secure processor to the wireless communications device;
receiving a third number into the secure processor from the wireless communications device; and
generating the authentication key in the secure processor using the first number and the third number.

19. The method of claim 18 wherein generating the authentication key further comprises:
generating a fourth number in the wireless communications device;
generating the third number in the wireless communications device using the fourth number;
transferring the third number from the wireless communications device to the secure processor;
receiving the second number into the wireless communications device from the secure processor; and
generating the authentication key in the wireless communications device using the second number and the fourth number.

20. A system for authenticating a wireless communications device that stores an authentication key, the system comprising:
a secure processor operational to receive an encrypted authentication key, to decrypt the encrypted authentication key, to generate shared secret data using the decrypted authentication key, and to transfer the shared secret data; and
an authentication system operationally coupled to the secure processor and operational to generate an authentication result using the shared secret data, to receive another authentication result from the wireless communications device, and to authenticate the wireless communications device if the authentication result generated in the authentication system matches the other authentication result from the wireless communications device.

21. The system of claim 20 further comprising the wireless communications device and wherein the wireless communications device is operational to generate the shared secret data using the authentication key, to generate the other authentication result using the shared secret data, and to transfer the other authentication result to the authentication system.

22. The system of claim 21 wherein the wireless communications device is operational to generate the authentication key.

23. The system of claim 21 further comprising a base station operational to transfer information between the wireless communications device and the authentication system.

24. The system of claim 20 wherein the secure processor is further operational to generate the authentication key, to encrypt the authentication key, and to transfer the encrypted authentication key to the authentication system.

25. The system of claim 24 wherein the authentication system is further operational to receive and store the encrypted authentication key from the secure processor.

26. The system of claim 20 wherein the secure processor is further operational to generate a Signaling Message Encryption key using the shared secret data.

27. The system of claim 20 wherein the secure processor is further operational to generate a Cellular Message Encryption Algorithm key using the shared secret data.

28. The system of claim 20 wherein the secure processor is further operational to generate a Voice Privacy Mask using the shared secret data.

29. The system of claim 20 wherein the secure processor is further operational to generate a Code Division Multiple Access Private Long Code Mask using the shared secret data.

30. The system of claim 20 wherein the wireless communications device is a Code Division Multiple Access device.

31. The system of claim 20 wherein the authentication system comprises a home location register.

32. A system for authenticating a wireless communications device that stores an authentication key, the system comprising:

a first secure processor operational to receive an encrypted authentication key, to decrypt the encrypted authentication key, to generate shared secret data using the decrypted authentication key, and to transfer the shared secret data;

a second secure processor operational to receive the encrypted authentication key, to decrypt the encrypted authentication key, to generate the shared secret data using the decrypted authentication key, and to transfer the shared secret data; and an authentication system operationally coupled to the first secure processor and the second secure processor and operational to generate an authentication result using the shared secret data, to receive another authentication result from the wireless communications device, and to authenticate the wireless communications device if the authentication result generated in the authentication system matches the other authentication result from the wireless communications device.

33. The system of claim 32 wherein the first secure processor and the second secure processor are operationally coupled and operational to generate an encryption key for decrypting the encrypted authentication key.

34. The system of claim 32 wherein the first secure processor and the second secure processor are operational to send the encryption key to a third secure processor.

35. A system for generating an authentication key and shared secret data for a wireless communications system, the system comprising:

a first secure processor operational to receive an encrypted authentication key, to decrypt the encrypted authentication key using an encryption key, to generate shared secret data using the decrypted authentication key, and to transfer the shared secret data;

an authentication system operationally coupled to the first secure processor and operational to receive the encrypted authentication key, to transfer the encrypted authentication key to the first secure processor, and to receive and store the shared secret data from the first secure processor; and a second secure processor operational to exchange information with a wireless communications device to generate the authentication key, and to encrypt the authentication key using the encryption key.

36. The system of claim 35 wherein the second secure processor is operational to transfer the encrypted authentication key to the authentication system.

37. The system of claim 35 wherein the second secure processor is operational to transfer the encrypted authentication key to a storage medium.

38. The system of claim 35 further comprising the wireless communications device and wherein the wireless communications device is operational to store the authentication key.

39. The system of claim 35 wherein the second secure processor is located at a facility where the wireless communications device is manufactured.

40. A product storing software for execution by a processor in a wireless communications system, the product comprising:

interface software operational when executed by the processor to direct the processor to receive an encrypted authentication key and to transfer the shared secret data;

encryption software operational when executed by the processor to direct the processor to decrypt the encrypted authentication key;

data generation software operational when executed by the processor to direct the processor to generate the shared secret data using the decrypted authentication key; and a software storage medium operational to store the interface software, the encryption software, and the data generation software.

41. The product of claim 40 wherein:

the data generation software is further operational when executed by the processor to direct the processor to generate the authentication key;

the encryption software is further operational when executed by the processor to direct the processor to encrypt the authentication key; and the interface software is further operational when executed by the processor to direct the processor to transfer the encrypted authentication key from the processor.

42. The product of claim 40 wherein the encryption software is further operational when executed by the processor to direct the processor to generate an encryption key.

43. The product of claim 40 wherein:

the interface software is further operational when executed by the processor to direct the processor to receive the shared secret data; and the data generation software is further operational when executed by the processor to direct the processor to generate an authentication result using the shared secret data.

* * * * *